United States Patent Office 2,858,294
Patented Oct. 28, 1958

2,858,294

POLYMERIZING DIALKYLSILOXANES WITH ALUMINUM CONTAINING COMPOUNDS

Herbert Jenkner, Hannover-Wulfel, Germany, assignor to Kali-Chemie A. G., Hannover, Germany No Drawing. Application May 17, 1956
Serial No. 585,404

Claims priority, application Germany May 18, 1955

4 Claims. (Cl. 260—46.5)

The invention relates to the preparation of higher polymerization products from liquid organopolysiloxanes.

It is known to convert liquid organopolysiloxanes, particularly dimethyl polysiloxanes, into higher polymerization products suitable for the manufacture of silicone rubbers, by heating the liquid polysiloxanes in the presence of acids or bases, or salts, salt hydrates, oxides, oxygen, peroxides, azo compounds, and other suitable compounds. It was necessary to heat the liquid organopolysiloxanes for extended periods of time (about 2–75 hours) at elevated temperatures (150–250° C.) to cause their gelation.

It is a principal object of the invention to provide a method which allows of gelling liquid organopolysiloxanes at low temperatures within a short period of time.

Other objects and advantages will be apparent from a consideration of the specification and claims.

I have found that liquid organopolysiloxanes can be further polymerized already at room temperature with organo aluminum compounds. The method is particularly adapted for the polymerization of liquid dialkyl polysiloxanes to dialkyl polysiloxane gels.

Suitable organo aluminum compounds are aluminum trialkyls and the etherates thereof, alkyl aluminum halides, alkyl aluminum alkoxides, or mixtures of said compounds; any organo aluminum compound may be used which contains at least one Al—C— linkage.

The rate of polymerization is, to a certain extent, a function of the amount of added organo aluminum compounds, but it depends also on the polymerization degree of the starting dialkyl polysiloxane. Amounts of .1 to 12 percent by weight of the organo aluminum compound, calculated on the organo polysiloxane, are generally sufficient; I prefer to use a range of about 1 to 5 percent by weight.

The further polymerization of liquid dimethyl polysiloxane is terminated in most cases already at room temperature within a few minutes. Sometimes, it may be necessary to use somewhat longer polymerization times at slightly elevated temperatures. Particularly in the latter case, it is of advantage to add to the mixture of organo polysiloxane and organo aluminum compound a certain amount of compounds containing reactive hydrogen. Such compounds are, for instance: organic and inorganic acids, alcohols, phenols, thiophenols, water, and the like. Frequently, the humidity of the atmosphere is already sufficient to polymerize the liquid organo polysiloxane in about 10 to 45 minutes at room temperature to a gel. Otherwise, I use about .1 to 30 percent, preferably 5 to 10 percent by weight of the reactive hydrogen containing compound, calculated on the organo aluminum compound.

Generally, the polymerization can be carried out without solvents or diluents, which, however, may be useful sometimes to ensure homogeneous polymerization.

The following examples are given to illustrate the wide variations of which the method of the present invention is susceptible; it is to be understood that they are not to be construed to limit the invention.

All parts are given by weight, unless indicated otherwise.

Example 1

2.3 parts of aluminum triethyl were added with stirring to a liquid dimethyl polysiloxane ($B_{16} > 220°$ C., oil bath) in a nitrogen atmosphere. After ten minutes, the liquid dimethyl polysiloxane had been converted to a colorless gel, which was at first still sticky but became tack-free after about one hour. The major part of the obtained gel could be dissolved in boiling benzene.

Example 2

The liquid dimethyl polysiloxane of Example 1 was diluted with an equal amount of hexane, and a total amount of 10 parts of aluminum triethyl was added dropwise with stirring. Already after 4 minutes, a gel was formed; the hexane was removed by filtration or vacuum distillation.

Example 3

5 parts of aluminum triethyl were dropped within 1½ hours into a liquid slightly yellowish dimethyl polysiloxane having a viscosity of 95 cps. at 22° C. The whole liquid dimethyl polysiloxane was converted into a colorless dimethyl polysiloxane gel.

Example 4

6 parts of aluminum triethyl were added all at once with vigorous stirring to the liquid dimethyl polysiloxane of Example 3. The whole batch was polymerized to a gel within 3 minutes.

Example 5

9 parts of aluminum triethyl were dropped within 10 minutes into a dimethyl polysiloxane having a viscosity of 3000 cps. at 22° C. A gel was formed, which liquefied after 5 minutes to a viscous syrup. If the mass was allowed to stand in air for about 1 to 3 hours, a crumbly non-tacky gel was formed, which could not be liquefied by heating.

Example 6

About 10 percent of the compound

$$(C_2H_5)_2AlOSi(CH_3)_3$$

were added to a liquid dimethyl polysiloxane having a viscosity of 125 cps. Instantaneously, a gel was formed, which, however, corresponded only to 50 percent of the starting liquid dimethyl polysiloxane. After addition of 1 drop of water, a complete polymerization of the still liquid portions to a gel was attained within 20 minutes.

Example 7

A total amount of 12 percent of aluminum triethyl was slowly added to the liquid dimethyl polysiloxane of Example 6, and the mixture was allowed to stand for one hour in an open dish. A dimethyl polysiloxane gel was obtained, which melted on heating and resolidified on cooling.

The products obtained according to the method of the invention are a suitable starting material for the manufacture of silicone rubber and the like, whereby the conventional fillers and/or catalysts or curing agents may be added.

I claim:

1. A method for the polymerization of liquid dialkylpolysiloxanes, comprising reacting a liquid dialkylpolysiloxane with an amount of about 0.1 to 12 percent by weight of a member of the group consisting of aluminum trialkyls and diethyl-aluminum trimethylsilanolate at a temperature of about 5 to 60° C. until a gel has been formed.

2. A method of converting a dimethylpolysiloxane fluid into a gel, said method comprising reacting said dimethylpolysiloxane fluid with an amount of about 0.1 to 12 percent by weight of an aluminum trialkyl at a temperature of about 5 to 60° C. until a gel has been formed.

3. A method of converting a dimethylpolysiloxane fluid into a gel, said method comprising reacting said dimethylpolysiloxane fluid with an amount of about 0.1 to 12 percent by weight of triethyl aluminum at a temperature of about 5 to 60° C. until a gel has been formed.

4. The method of claim 1, wherein the reaction is carried out in the presence of $H_2O$.

References Cited in the file of this patent

UNITED STATES PATENTS 2,460,799    Barry _____ Feb. 8, 1949